United States Patent
Saints et al.

[19]

[11] Patent Number: 6,075,974
[45] Date of Patent: *Jun. 13, 2000

[54] METHOD AND APPARATUS FOR ADJUSTING THRESHOLDS AND MEASUREMENTS OF RECEIVED SIGNALS BY ANTICIPATING POWER CONTROL COMMANDS YET TO BE EXECUTED

[75] Inventors: Keith W. Saints; Tao Chen, both of San Diego, Calif.

[73] Assignee: Qualcomm Inc., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/752,860

[22] Filed: Nov. 20, 1996

[51] Int. Cl.⁷ .............................. H04B 1/00; G08C 1/00; H04Q 7/30; H04Q 7/32
[52] U.S. Cl. .............................. 455/69; 455/522
[58] Field of Search ....................... 455/69, 522

[56] References Cited

U.S. PATENT DOCUMENTS

| | | | |
|---|---|---|---|
| 3,925,782 | 12/1975 | Anderl et al. | 343/178 |
| 4,112,257 | 9/1978 | Frost | 179/2 |
| 4,123,718 | 10/1978 | Lampert et al. | 325/474 |
| 4,193,031 | 3/1980 | Cooper et al. | 455/38 |
| 4,222,115 | 9/1980 | Cooper et al. | 375/1 |
| 4,225,976 | 9/1980 | Osborne et al. | 455/226 |
| 4,495,648 | 1/1985 | Giger | 455/73 |
| 4,580,262 | 4/1986 | Naylor et al. | 371/5 |
| 4,613,990 | 9/1986 | Halpern | 455/33 |
| 4,641,322 | 2/1987 | Hasegawa | 375/1 |
| 4,672,658 | 6/1987 | Kavehrad et al. | 379/63 |
| 4,765,753 | 8/1988 | Schmidt | 379/60 |
| 4,766,599 | 8/1988 | Miyazaki | 375/8 |
| 4,777,653 | 10/1988 | Bonnerot et al. | 455/69 |
| 4,811,421 | 3/1989 | Havel et al. | 455/69 |
| 4,868,795 | 9/1989 | McDavid et al. | 367/77 |
| 4,870,698 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,077,742 | 12/1991 | Tsumura et al. | 371/32 |
| 5,093,840 | 3/1992 | Schilling | 375/1 |
| 5,257,283 | 10/1993 | Gilhousen et al. | 375/1 |
| 5,305,468 | 4/1994 | Bruckert et al. | 455/69 |
| 5,450,616 | 9/1995 | Rom | 455/69 |
| 5,461,639 | 10/1995 | Wheatley, III et al. | 370/342 |
| 5,504,773 | 4/1996 | Padovani | 375/200 |
| 5,535,238 | 7/1996 | Schilling et al. | 375/200 |
| 5,570,353 | 10/1996 | Keskitalo et al. | 370/335 |
| 5,574,972 | 11/1996 | Hulbert | 455/436 |
| 5,623,486 | 4/1997 | Dohi et al. | 370/342 |
| 5,699,485 | 12/1997 | Shoham | 704/223 |
| 5,761,212 | 6/1998 | Foland, Jr. et al. | 371/21.2 |
| 5,778,030 | 7/1998 | Bruckert et al. | 375/317 |

FOREIGN PATENT DOCUMENTS

| | | |
|---|---|---|
| 0212667 | 3/1987 | European Pat. Off. . |
| 9217011 | 2/1992 | WIPO . |

*Primary Examiner*—Daniel S. Hunter
*Assistant Examiner*—Alan T. Gantt
*Attorney, Agent, or Firm*—Phillip Wadsworth; Sean English; Byron Yafuso

[57] ABSTRACT

The present invention provides a method and apparatus for providing improved quality or power control by recognizing the delays inherent in a closed-loop communication system. The mobile station or receiver properly adjusts its forward link quality or power level thresholds or measurements with which it compares incoming frames or portions thereof to reflect the level it anticipates receiving (after the delay). For example, the mobile station can recognize that at a given measurement time, two outstanding messages have not been executed by the transmitter (where each message indicates a corresponding increase of 1 dB). As a result, the mobile station can adjust its measurement threshold down by 2 dB to more closely correspond to future power adjustments. If the currently received frame or portion thereof is still below the readjusted threshold, then the mobile station sends out a new message to request a further increase in the forward link channel.

10 Claims, 6 Drawing Sheets

METHOD AND APPARATUS FOR ADJUSTING THRESHOLDS AND MEASUREMENTS OF RECEIVED SIGNALS BY ANTICIPATING POWER CONTROL COMMANDS YET TO BE EXECUTED

BACKGROUND OF THE INVENTION

I. Field of the Invention

The present invention relates to communication systems. More particularly, the present invention relates to a method and apparatus for providing power control in a closed-loop communication system.

II. Description of the Related Art

The use of code division multiple access (CDMA) modulation techniques is one of several techniques for facilitating communications in which a large number of system users exist. Other multiple access communication system techniques, such as time division multiple access (TDMA) and frequency division multiple access (FDMA) are known in the art. However, the spread spectrum modulation techniques of CDMA have significant advantages over other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," also assigned to the assignee of the present invention, and is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user or mobile station through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

If the transmission power of signals transmitted by the base station to a mobile station is too high, it can create problems such as interfering with other mobile stations. Alternatively, if the transmission power of signals transmitted by the base station is too low, then the mobile station can receive multiple erroneous frames. Terrestrial channel fading and other known factors can affect the received power of signals transmitted by the base station. As a result, each base station must rapidly and accurately adjust the transmission power of the signals which it transmits to the mobile stations.

In a useful method for controlling the transmission power of signals transmitted by a base station, the mobile station transmits a signal or message to the base station when the power of a received frame of data deviates from a threshold or is received in error. In response to this message, the base station increases its transmission power of signals transmitted by the base station. A method and apparatus for controlling transmission power is disclosed in U.S. Pat. No. 5,056,109, entitled "METHOD AND APPARATUS FOR CONTROLLING TRANSMISSION POWER IN A CDMA CELLULAR TELEPHONE SYSTEM," assigned to the assignee of the present invention and incorporated by reference herein.

A delay necessarily exists under the above closed loop communication system. The delay includes the time when the base station transmits the frame with inadequate power, when the mobile station receives the erroneous frame, when the mobile station detects the error (e.g., signal falls below the threshold or a frame erasure is declared), when the mobile station transmits an appropriate error message to the base station, and when the base station receives the error message and appropriately adjusts its transmission power. The communication system, typically, transmits packets of data as discrete frames. As a result, the communications system cannot rapidly compensate for transmission power fluctuations. Additionally, the mobile station could request too great of an increase in the forward link transmission power before recognizing such an increase due to the inherent delay described above.

SUMMARY OF THE INVENTION

The present invention solves problems of prior communication systems, and provides additional benefits, by allowing a mobile station or base station to anticipate the delays inherent in closed-loop communication systems. As noted above, mobile stations typically send quality or error messages over the reverse link channel to the base station, where the messages indicate the quality or power level of each frame or portions of the frame received in the forward link channel. If the mobile station detects a change in quality or power on the forward channel, the mobile station provides a message to the base station to request that the forward channel be appropriately increased or decreased.

In the present invention, the mobile station or receiver properly adjusts its forward link power level thresholds or measurements with which it compares incoming frames or portions of frames to reflect the quality or power level it anticipates receiving (after the aforementioned delay) in response to previously sent power adjustment commands. For example, the mobile station can recognize that at a given measurement time, two outstanding messages have not been executed by the remote transmitter (where each message indicates a corresponding increase of 1 dB). As a result, the mobile station can adjust its measurement threshold down by 2 dB to more closely correspond to future power adjustments. If the currently received frame or portion thereof is still below the readjusted threshold, then the mobile station sends out a new message to request a further increase in the power of the forward link channel. Conversely, if the received frame or portion of the frame is greater than the adjusted quality threshold, the mobile station does not request a further increase in power. The base station similarly sends messages over the forward link to the mobile station which indicate the quality or power level of the reverse link. As a result, the present invention can similarly be employed by the base station to properly adjust its reverse link quality level thresholds with which it compares incoming reverse link signals to reflect anticipated adjustments in the transmission power at the mobile station.

In a broad sense, the present invention embodies a communication system having a base station and at least one user station. A system user of the user station transmits to and receives from the base station communication signals. A method for controlling transmission signal power of transmitted communication signals for the base station includes the steps of: (a) transmitting a current communication signal; (b) receiving the current communication signal; (c) determining a quality level of the current communication signal; (d) adjusting a quality level threshold based on at least one prior power control message; (e) comparing the adjusted quality level threshold to the quality level of the current communication signal; (f) transmitting a current power control message based on the comparison; and (g) transmitting a new communication signal at an adjusted power level based on the current power control message.

The present invention also embodies a communication system having a base station and a user station. The base station transmits signals to and receives signals from the user station. The user station includes a receiver, a measurement circuit, a processor and a transmitter. The receiver receives a current received signal from the base station. The measurement circuit is configured to determine a level of the current signal. The processor is configured to adjust a measurement value based on at least one prior control message and compare the adjusted measurement value to the level of the current signal. The transmitter transmits a current control message to the base station to request that the base station transmit a new signal at an adjusted level based on the current control message.

BRIEF DESCRIPTION OF THE DRAWINGS

The features and advantages of the present invention will become more apparent from studying the detailed description together with the following figures. In the figures, like reference characters identify similar elements.

DETAILED DESCRIPTION OF THE PREFERRED EMBODIMENTS

A communication system, and in particular, a power control apparatus and method for the system, is described in detail herein. In the following description, numerous specific details are set forth such as specific number of bits, power levels of signals, etc., in order to provide a thorough understanding of the present invention. One skilled in the relevant art, however, will readily recognize that the present invention can be practiced without these specific details, or with other numbers of bits, levels of signals, etc. In other instances, well-known structures are not shown in detail in order to avoid obscuring the present invention.

Figure 1:
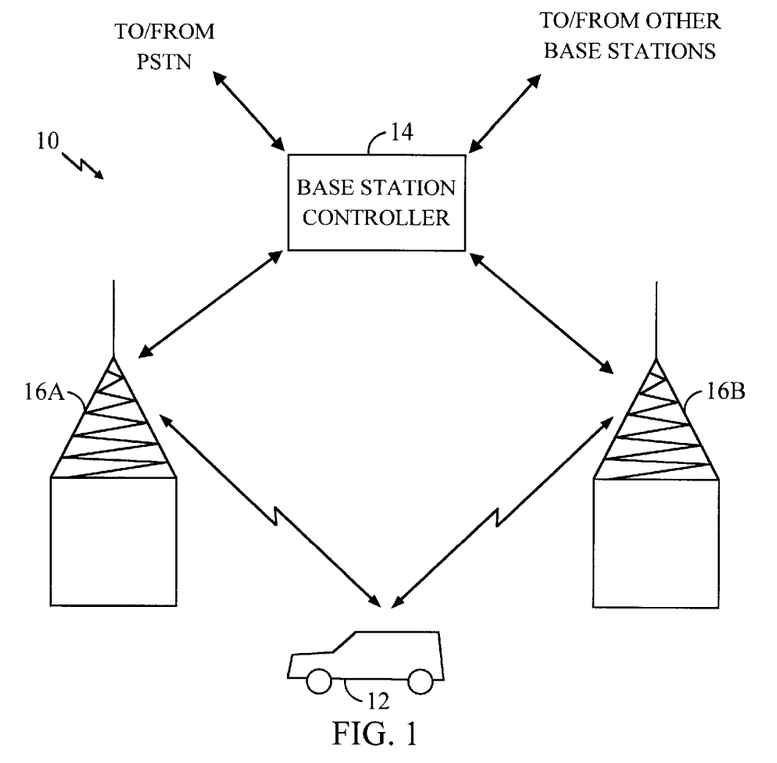
FIG. 1 illustrates a general closed loop power control system of the present invention.

FIG. 1 illustrates exemplary cellular subscriber communication system 10 in which the present invention may be implemented. The system of FIG. 1 preferably utilizes spread spectrum modulation techniques such as CDMA for communicating between users of mobile stations (e.g., mobile telephones) and cell-sites or base stations. In FIG. 1, mobile station 12 communicates with base station controller 14 by means of one or more base stations 16a, 16b, etc. Base station controller 14 is coupled to and typically includes interface and processing circuitry for providing system control to base stations 16a and 16b. Base station controller 14 can also be coupled to and communicate with other base stations, and possibly even other base station controllers.

When system 10 is configured to process telephone calls, base station controller 14 routes telephone calls from a public switched telephone network (PSTN) to base station 16a or 16b for transmission to the appropriate mobile station 12. Also, base station controller 14 functions to route calls from mobile station 12 via at least one base station 16a or 16b to the PSTN. Base station controller 14 can also connect calls between mobile stations 12 and other mobile stations (not shown).

Base station controller 14 can be coupled to base stations 16a and 16b by various means such as dedicated telephone lines, optical fiber links or microwave communication links. Double-arrowed lines shown in FIG. 1 define the possible communication links between mobile station 12 and base stations 16a and 16b, and between the base stations and base station controller 14.

Figure 2A:
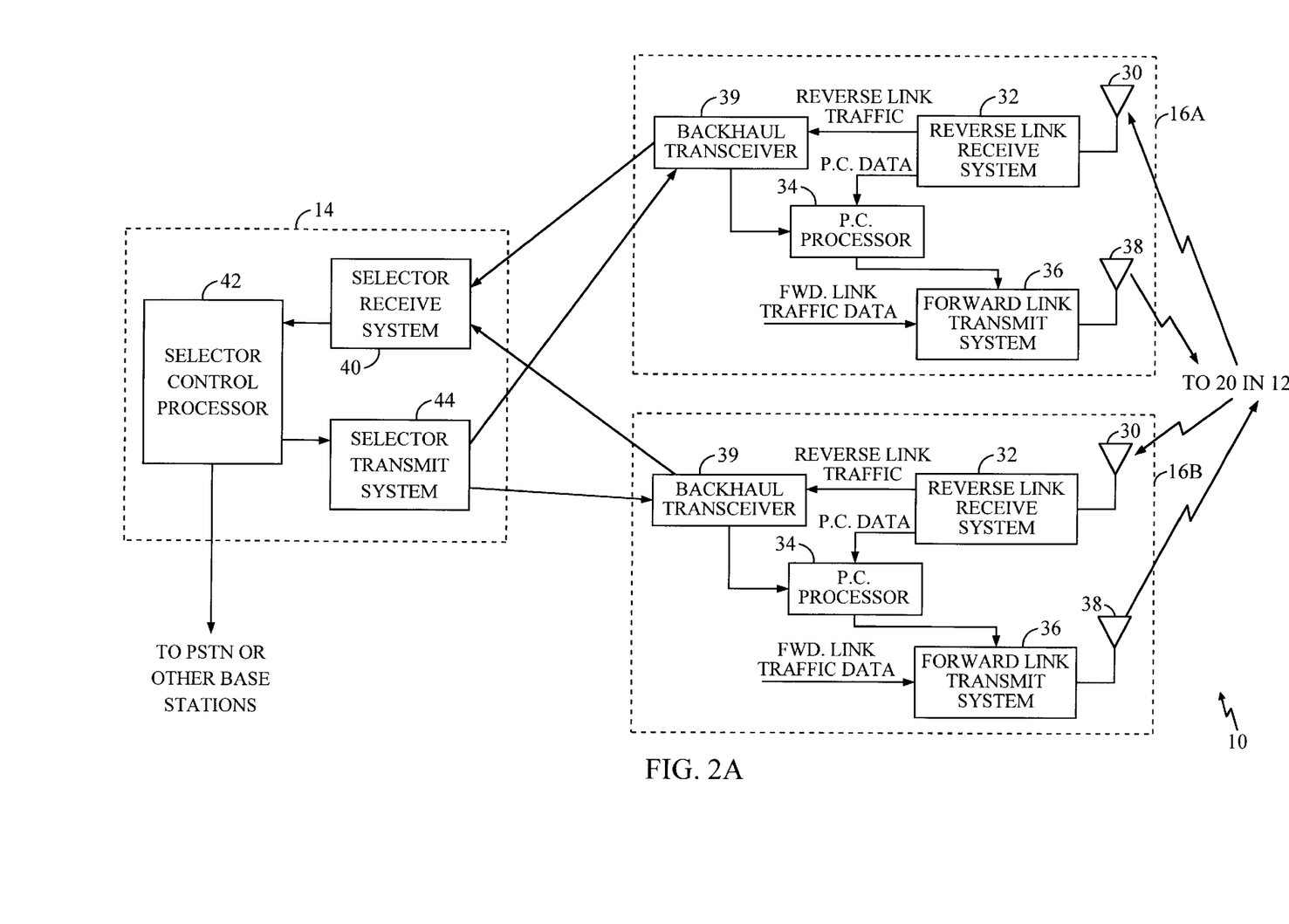
FIGS. 2A–2B are block diagram of the closed loop power control system of FIG. 1.
Figure 2B:
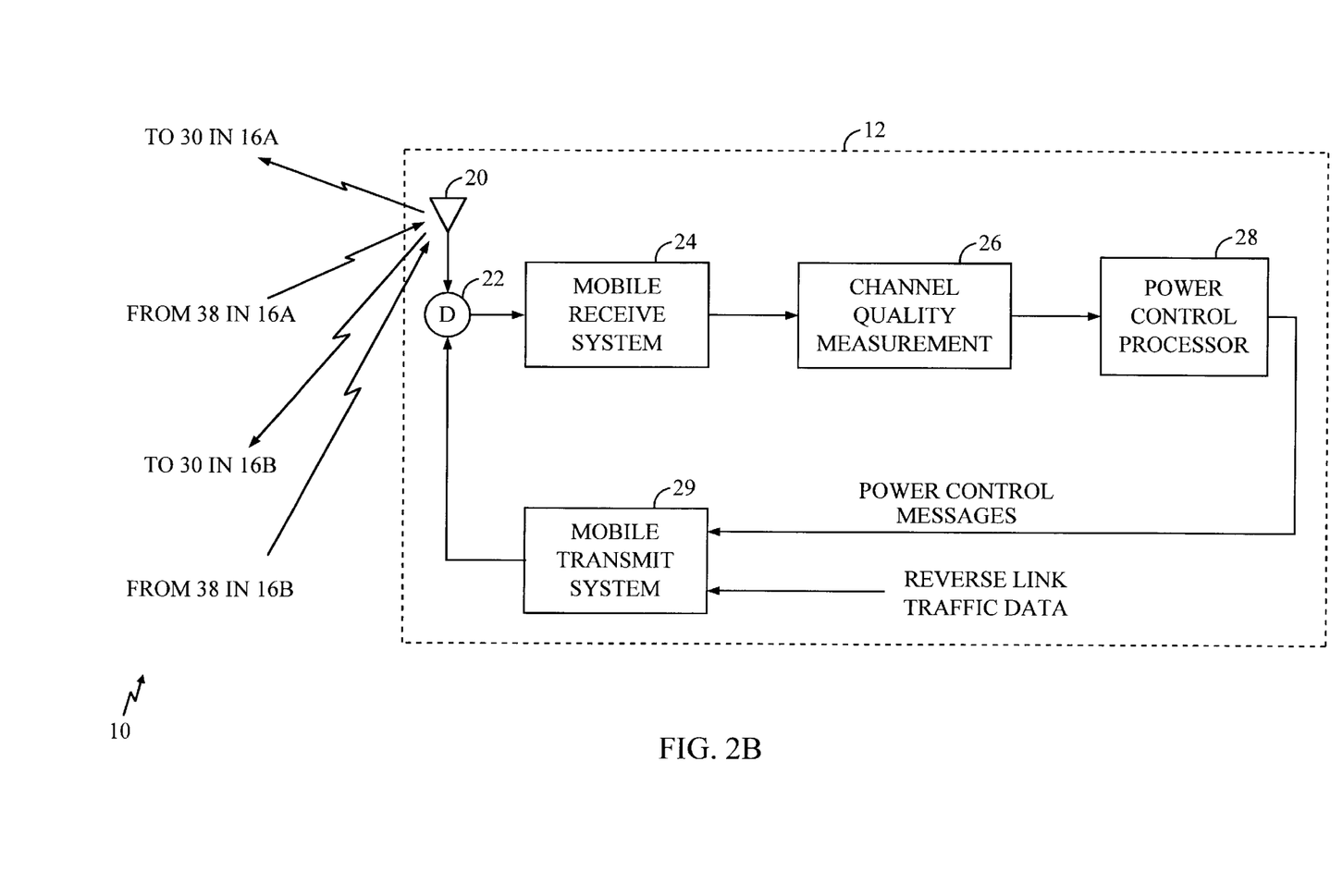

FIGS. 2A and 2B (hereinafter referred to collectively as FIG. 2) illustrates the situation where mobile station 12 is in soft handoff between the cell covered by base station 16a and the cell covered by base station 16b. It will be understood that description is easily extended the situation where only one base station 16a or 16b is in communication with mobile station 12 and to the case where more than two base stations are in communication with the mobile station.

Referring to the block diagram of communication system 10 in FIG. 2, mobile station 12 includes antenna 20 that transmits signals to, and receives signals from, base stations 16a and 16b. Duplexer 22 provides a forward link channel or signal from base stations 16a and 16b to mobile receiver system 24 (mobile RCV system). Receiver system 24 down-converts, demodulates and decodes the received signal. Receiver system 24 then provides a predetermined parameter or set of parameters to quality measurement circuit 26. Examples of parameters might include measured signal to noise ratio (SNR), measured received power, or decoder parameters such as symbol error rate, Yamamoto metric, or parity bit check indication. Channel quality measurement circuit 26 receives the parameters from mobile receiver system 24 and determines a quality measurement signal or power level of the received signal. Quality measurement circuit 26 can generate energy per bit ($E_b$) or energy per symbol ($E_s$) measurements from portions or windows of each frame. Preferably, the energy per bit or energy per symbol measurements are normalized (e.g., $E_b/N_o$), or normalized and include interference factors (e.g., $E_b/N_t$). Based on these measurements, quality measurement circuit 26 produces the power level signal.

Power control processor 28 receives the power level signal from quality measurement circuit 26, compares the signal to an adjustable threshold and produces a power control message based on the comparison, as described in detail below. In sum, power control processor 28 adjusts the threshold based on unexecuted power control messages.

Alternatively, power control processor 28 provides the adjustable threshold to quality measurements circuit 26. Quality measurement circuit 26 in turn compares the parameters received from mobile receiver 24 to the adjusted threshold and produces the power level signal for power control processor 28 in response thereto, as described below.

Power control processor 28 produces preferably several (e.g., 8 or 16) power control messages in response to several power level signals per frame, where each power control message can indicate a change in power for the forward link signal. For example, the power control message could be a binary value, where a "1" value requests base station 16a or 16b to increase the gain of the forward link signal, while a "0" value requests that the signal be decreased.

Mobile transmission system 29 (Mobile Transmit System) encodes, modulates, amplifies and up converts the power control message, via duplexer 22 and antenna 20. In the exemplary embodiment, mobile transmission system 29 provides the power control message in a predetermined location of an outgoing reverse link frame. Mobile transmission system 29 also receives reverse link traffic data which can correspond to voice data from the user of mobile station 12. In the exemplary embodiment, the power control messages are punctured into the reverse link traffic data.

Each base station 16a and 16b includes receiving antenna 30 that receives the reverse link frames from mobile station 12. Receiver systems 32 of base stations 16a and 16b down convert, amplify, demodulate and decode the reverse link traffic. In addition, receiver system 32 separates the power control messages from each reverse link traffic frame and provides the power control messages to power control processor 34. Henceforth, much of the description of the present invention is described with respect to only a single base station 16a. Unless otherwise noted herein, the description applies equally to second base station 16b.

Power control processor 34 monitors the power control messages and produces a forward link transmitter power signal to forward link transmitter system 36. Forward link transmitter system 36, in response thereto, either increases, maintains, or decreases the power of the forward link signal. The forward link signal is then transmitted via transmitting antenna 38. Forward link transmitter system 36 also receives forward link traffic data which it encodes, modulates and transmits via antenna 38. Mobile receiver system 24, mobile transmission system 29, receiver system 32 and transmitter system 36 are either a CDMA receiver or transmitter as described in the aforementioned U.S. Pat. Nos. 4,901,307 and 5,103,459 under the exemplary embodiment.

Unless described otherwise below, the construction and operation of the various blocks shown in FIG. 2 are of conventional design. As a result, such blocks need not be described in further detail herein, as they will be understood by those skilled in the relevant art. Such description is omitted for purposes of brevity and so as not to obscure description of the present invention. Any modifications necessary to the blocks of communication system 10 in FIG. 2 can be readily made by one skilled in the art based on the detailed description provided herein.

Figure 3A:
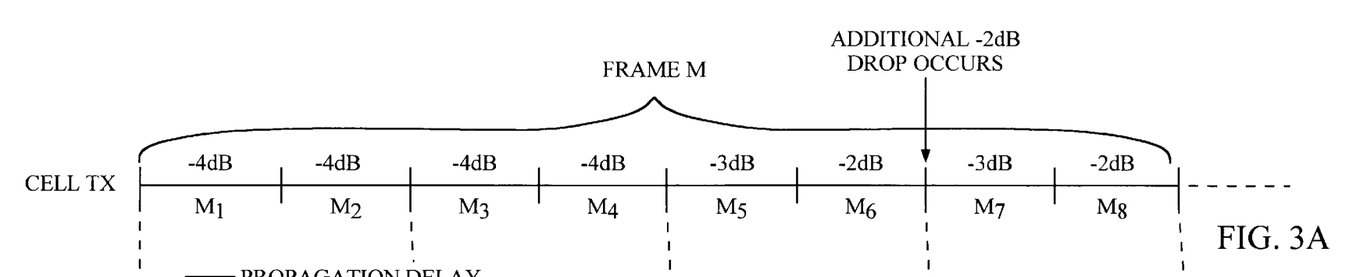
FIGS. 3A–3H are timing diagrams showing delays inherent in the closed loop power control system of FIG. 1 when a mobile station recognizes a decrease in power in a forward link transmission signal from a base station, and shows how the present invention compensates for such delays.
Figure 3B:
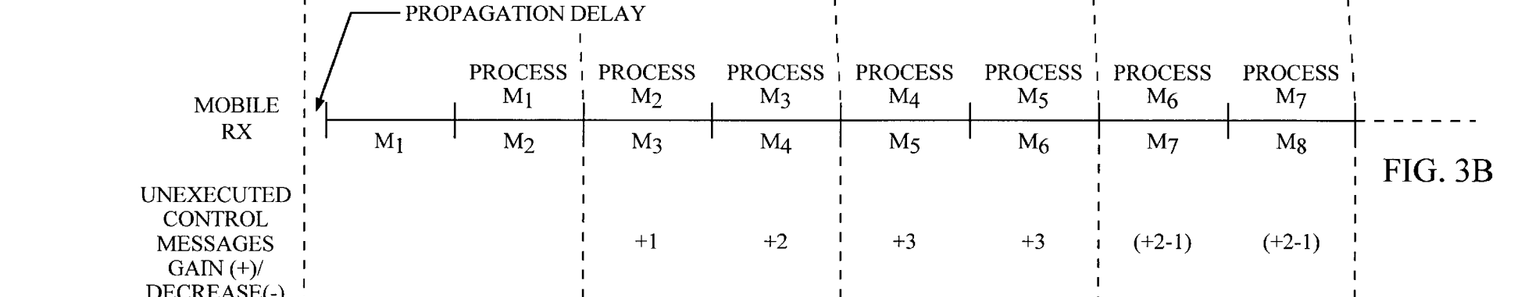
Figure 3C:
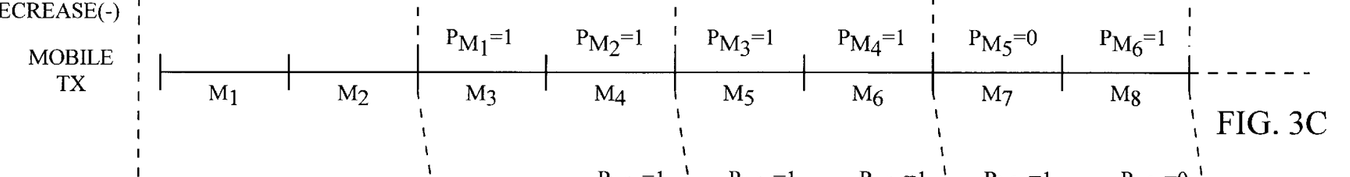
Figure 3D:
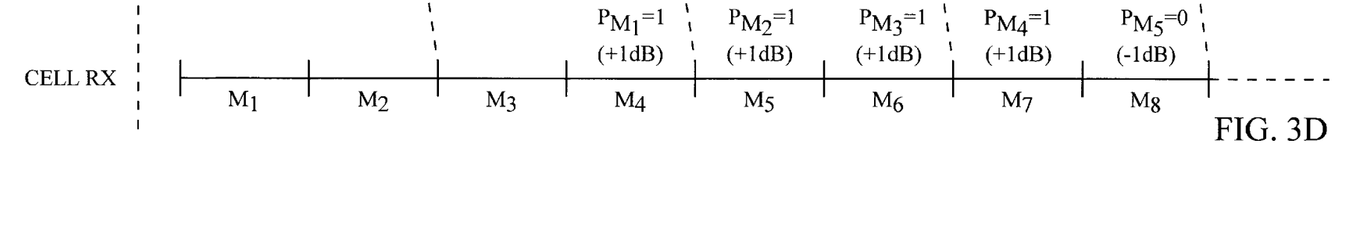
Figure 3E:
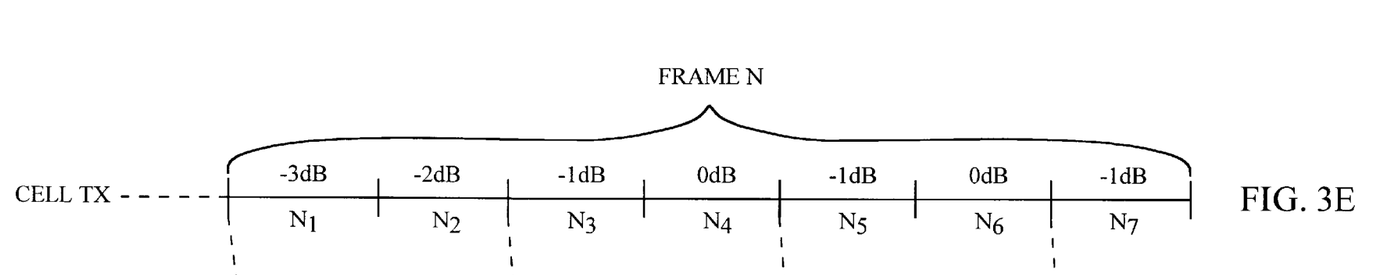
Figure 3F:
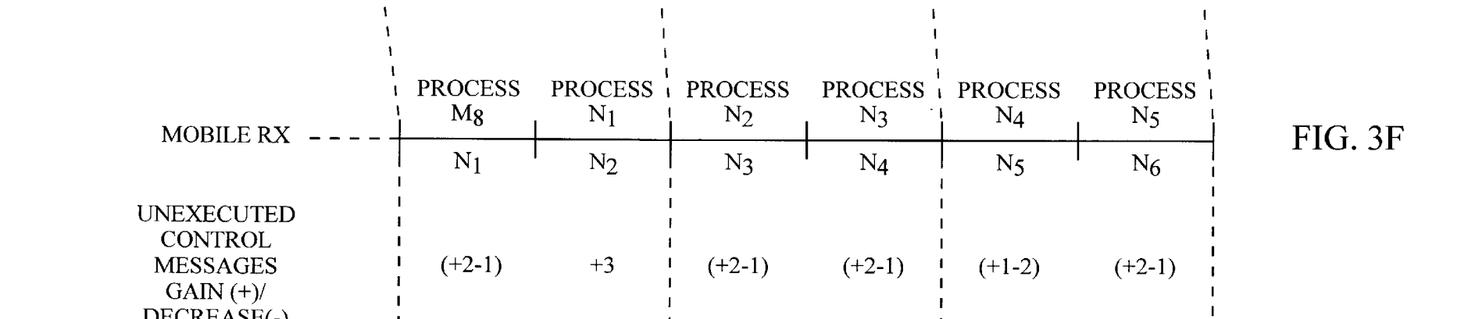
Figure 3G:
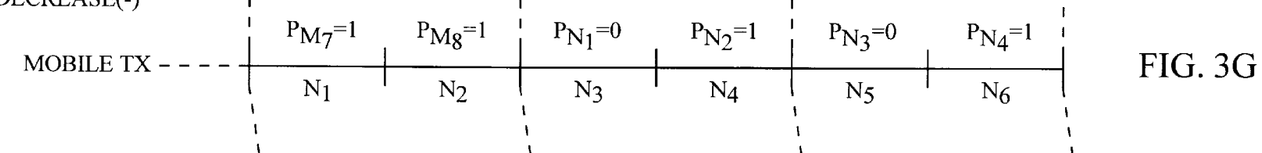
Figure 3H:
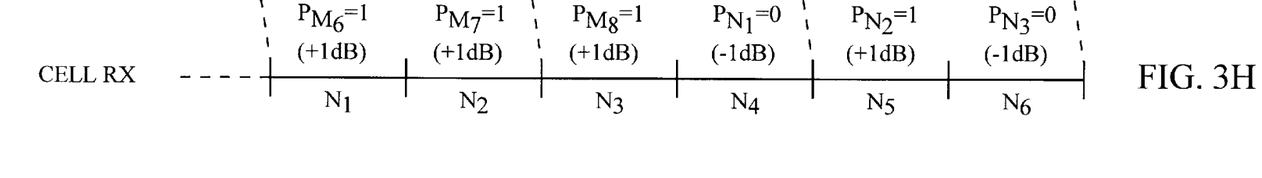

In the following description for FIGS. 3A–3D, FIG. 3A collectively refers to FIGS. 3A and 3E, FIG. 3B collectively refers to FIGS. 3B and 3F, FIG. 3C collectively refers to FIGS. 3C and 3G, and FIG. 3D collectively refers to FIGS. 3D and 3H. Referring to FIGS. 3A through 3D, delays typical in closed loop power control system 10 will be described. FIG. 3A shows multiple windows in first and second frames m and n, respectively, transmitted by base station 16a. As shown in FIG. 3A (and also in FIGS. 3B–3D), each frame is divided into an exemplary eight windows (e.g., frame m consists of windows $m_1$ through $m_8$). A deviation from a desired transmission power level (e.g., 6 dB) is shown with respect to each window in FIG. 3A. For example, a value of −4 dB corresponds to a drop of 4 dB from the desired receive power level at mobile station 12, while a value of 0 dB corresponds to a value equal to the desired receive power level at mobile station 12.

In general, the exemplary timelines of FIGS. 3A–3D and the following discussion refer to deviations of the power of the forward link signal from the desired power level or from an adjustable threshold power level $P_{TH}$. The present invention is equally applicable to measurements of the absolute power level, rather than in changes from a certain power level, as described below.

FIG. 3B shows the windows of frames m and n in the forward link signal that are received by mobile station 12. FIG. 3B shows a number of unexecuted power control messages (due to the delay) below the corresponding window. A positive number indicates a total increase value of between one and three unexecuted +1 dB increase power control messages (e.g., +3 equals a +3 dB increase from three unexecuted messages). A negative number indicates a total decrease value (e.g., (+1 −2) equals a total −1 dB decrease value from one +1 dB and two −2 dB decrease messages).

FIG. 3C shows the windows transmitted along the reverse link signal by mobile station 12 to base station 16a. FIG. 3C shows above these windows the power control messages (P) transmitted on the reverse-link signal, where the subscript of the message indicates from which window in the forward link signal the message was generated. For example, a power control message $P_{m1}$ corresponds to a window $m_1$ in the forward link signal, although mobile station 12 does not transmit the message $P_{m1}$ until two windows later during a window $m_3$, as discussed in detail below.

FIG. 3D shows the windows received on the reverse link signal by base station 16a. FIG. 3D shows the power control messages P received at base station 16a during the corresponding window, whether the message has a binary 1 or 0 value, and whether the message indicates an increase or decrease of 1 dB (+or −1 dB) in the forward link signal.

The exemplary delays inherent in communication system 10 will first be discussed with respect to FIG. 3A–3D. Thereafter, operation of communication system 10 will be discussed with respect to the example of FIG. 3A–3D. Referring first to FIG. 3A, if base station 16a transmits a first window $m_1$ during frame m, mobile station 12 receives the window $m_1$ a small one-way propagation delay later (FIG. 3B). As shown in FIG. 3B, mobile station 12 typically does not process the power level of window $m_1$ until one window later (i.e., during a second window $m_2$). During the second window $m_2$, mobile station 12 generates a power control message corresponding to the previous window ($m_1$). During such processing, mobile station 12 compares the received power level of the forward link signal to the adjustable power level threshold $P_{TH}$ to determine how far from the desired power level the received power level will presumably be after base station 16a executes previous, unexecuted power control messages, as described more fully below.

During a third window $m_3$, mobile station 12 transmits a first power control message ($P_{m1}$) corresponding to the first window $m_1$. As noted above, the power control messages P in the exemplary embodiment indicate in which direction the power level of the forward link signal should be changed. If the power control message has a value of 1 or 0, then base station 16a determines that the power level of the forward link signal should be increased or decreased by a predetermined value (e.g., +1 dB or −1 dB), respectively. As shown in FIG. 3A, the forward link signal received by mobile station 12 during the first window $m_1$ suffers from a −4 dB drop in power from the desired power level, mobile station 12 will not recognize this drop in the power until the second window $m_2$, and will not transmit the power control message $P_{m1}=1$ requesting an increase in power until the third window $m_3$. The drop in power results from a degradation of the propagation path as a result of shadowing or fading.

During a fourth window $m_4$ (FIG. 3D), base station 16a receives and processes the power control message $P_{m1}$ for the first window $m_1$. In the exemplary embodiment where each power control message has only a single bit, the message $P_{m1}$ will have a binary value 1, and base station 16a increases the forward link transmission signals by 1 dB in response thereto. Therefore, base station 16a increases the power of a fifth window $m_5$ by 1 dB to provide a deviation of only −3 dB from the desired power level (FIG. 3A). In sum, communication system 10 suffers from an exemplary three window delay between when a drop in the forward link signal is received by mobile station 12 (window $m_1$), and when a subsequent increase in the forward link signal is provided by base station 16a (window $m_5$). Mobile station 12 does not recognize the increase in the forward link signal until a sixth window $m_6$.

Importantly, power control processor 28 of mobile station 12, under a routine 100 described below, generates power control messages based on previous, unexecuted power control messages so as to avoid overcompensating power adjustment of the forward link signal. Therefore, during the third window $m_3$ (FIG. 3B), the mobile station adjusts the power level threshold $P_{TH}$ based on the unexecuted 1 dB increase provided by the first power control message $P_{m1}$. Since the −4 dB drop from the desired power level in the forward link signal during window $m_2$ is still not equal to or greater than a −1 dB adjustment of the power level threshold $P_{TH}$, mobile station 12 during the fourth window $m_4$ transmits a second power control message $P_{m2}$ for window $m_2$ (FIG. 3C) indicating to base station 16a to increase the transmission power of its forward link signal ($P_{m2}=1$). Mobile station 12 repeats the same process for windows $m_3$ and $m_4$ transmitted by base station 16a, processed by the mobile station during windows $m_4$ and $m_5$, and transmitted as third and fourth power control messages $P_{m3}$ and $P_{m4}=1$ during windows $m_5$ and $m_6$.

In sum, mobile station 12 in the exemplary embodiment preferably continuously receives the forward link signal at the desired power level. Power control processor 28, therefore, adjusts the power level threshold $P_{TH}$ from the desired power level to compensate for unexecuted power control messages that remain unexecuted at a given time due to the exemplary three window delay. Therefore, if two outstanding +1 dB power control messages and one outstanding −1 dB power control message exist, resulting in a total +1 dB increase, mobile station 12 adjusts the power level threshold $P_{TH}$ by a corresponding opposite amount (−1 dB). If the power of the forward link signal is less than the adjusted power level threshold $P_{TH}$, then mobile station 12 provides a power control message requesting a +1 dB increase, while if the received power is equal to or greater than the threshold, mobile station 12 requests a −1 dB decrease.

During the sixth window $m_6$ (FIG. 3B), mobile station 12 determines that three unexecuted power control messages have been sent (corresponding to a +3 dB increase). Therefore, mobile station 12 adjusts its power level threshold $P_{TH}$ by a corresponding −3 dB, and compares the adjusted threshold to the power of the forward link signal received during window $m_5$ to determine if the received power is equal to or greater than the threshold. Since the received power similarly differs by −3 dB from the desired level, and thus is equal to the adjusted power level threshold $P_{TH}$, mobile station 12 transmits during a seventh window $m_7$ (FIG. 3C) a fifth power control message $P_{m5}$ of 0, requesting a decrease of 1 dB in the forward link signal. It should be noted that the case where the measured power level equals the threshold is rare given sufficient quantization of the received quality, but is provided for illustrative purposes. When the received power equals the threshold, mobile station 12 could alternatively request an increase in the transmission power or randomly send a power control signal.

Since the exemplary embodiment employs single bit power control messages, the power of the forward link signal preferably oscillates between approximately +1 and −1 dB with respect to the desired power level. Therefore, during the sixth window $m_6$ (FIG. 3B), when mobile station 12 recognizes that the current −3 dB deviation in the received signal is equal to the adjusted power level threshold $P_{TH}$ of −3 dB (based on three unexecuted +1 dB power control messages), the mobile station 12 anticipates that three windows later the power of the received forward link signal will be at approximately +1 dB above the desired power level. Consequently, during the seventh window $m_7$ (FIG. 3C), mobile station 12 provides the fifth power control message $P_{m5}$ requesting a decrease of 1 dB to base station 16a ($P_{m5}=0$).

Under the present example, the seventh window $m_7$ of FIG. 3A reflects a degradation or further decrease of the forward link signal, as compared to the previous window $m_6$ (i.e., from −2 dB to −3 dB). In this example a 2 dB degradation in the propagation path has occurred during the time period of window $m_7$. This degradation is a result of external factors such as shadowing of mobile station 12. The deviation of power of the forward link signal during window $m_7$, −3 dB, is equal to the power deviation in the previous window $m_6$ (−2 dB), modified by the cumulative effect of the additional loss over the radio channel (−2 dB) and the adjustment by by the base station due to power control command $P_{m3}$ (+1 dB).

During an eighth window $m_8$ (FIG. 3B), when mobile station 12 processes the received window $m_7$, mobile station 12 recognizes only a total of +1 dB in unexecuted power control messages, and expects the power of the received forward link signal to be improved by the previous messages (i.e., suffer from only a −1 dB drop). Thus, mobile station 12 adjusts the power level threshold $P_{TH}$ by −1 dB. During the eighth window $m_8$ (FIG. 3B), however, mobile station 12 determines that the −3 dB deviation of the power level of the received forward link signal is less than the −1 dB adjusted power level threshold $P_{TH}$, and thus determines that the power of the forward link signal should be further increased by 1 dB. Consequently, during a first window $n_1$ in the second frame n (FIG. 3C), mobile station 12 provides a seventh power control message $P_{m7}$ to base station 16a requesting that the forward link signal be increased again by 1 dB (i.e., $P_{m7}=1$).

From the eighth window $m_8$ in the first frame m to a first window $n_1$ in the second frame n (FIG. 3A), the power of the received forward link signal further degrades from −2 dB to −3 dB because the fifth power control message $P_{m5}$ causes base station 16a to attenuate the forward link signal by 1 dB, even though the signal itself suffers from no further degradation in the present example. (Recall, mobile station 12 anticipated a full correction of the initial −4 dB decrease in the forward link signal during the sixth window $m_6$ (FIG. 3B), and thus generated the fifth power control message $P_{m5}$ that requested a −1 dB decrease.)

Thereafter, the forward link signal is incrementally increased and then oscillates between 0 and −1 dB during windows $n_2$ through $n_7$, as shown in FIG. 3A. Such an improvement in the forward link signal is due to mobile station 12 adjusting the power level threshold $P_{TH}$ to −3 dB during window $n_2$ (FIG. 3B), and thus producing a +1 dB increase power control command $P_{m8}$ during window $n_2$ (FIG. 3C). The oscillation of the forward link signal about the desired level during windows $n_4$ through $n_7$ (FIG. 3A) results from mobile station 12 adjusting the power level threshold $P_{TH}$ to −3 dB, −1 dB and +1 dB during windows $n_2$ through $n_4$, respectively (FIG. 3B), and thus producing a series of power control messages $P_{n1}$, $P_{n2}$ and $P_{n3}$ having values of 0, 1 and 0, respectively (FIG. 3D).

Figure 4:
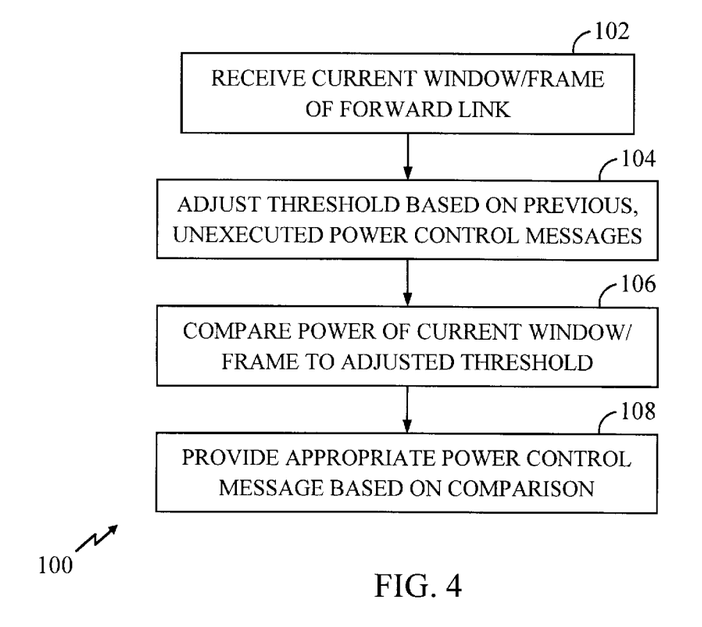
FIG. 4 is an exemplary flow diagram of a method for determining power control messages to appropriately adjust the transmission power of forward link transmissions from the base station under the present invention.

Referring to the flowchart of FIG. 4, a routine 100 performed by power control processor 28 in mobile station 12 considers the several window delay when generating power control messages in response to received forward link signals. Those skilled in the relevant art can create source code based on the flowchart of FIG. 4 and the detailed description provided herein. Routine 100 is preferably stored in memory (not shown) that forms part of power control processor 28.

In step 102, channel quality measurement circuit 26 receives the current window of the forward link signal from base station 16a. Channel quality measurement circuit 26 in response thereto provides the power measurement signal to power control processor 28 in step 102 that indicates the power level of the current window.

In step 104, power control processor 28 adjusts the power level threshold $P_{TH}$ based on previous, unexecuted power control messages. Therefore, as described above with respect to FIGS. 3A through 3D, if for example three +1 dB increase commands have been unexecuted, then power control processor 28 in step 104 decreases the power level threshold $P_{TH}$ by −3 dB to compensate for the three unexecuted power control messages. Alternatively, power control processor 28 can provide the adjusted power level threshold $P_{TH}$ or other appropriate instructions to quality measurement circuit 26. Quality measurement circuit 26, in turn, can then appropriately measure the received forward link signal based on the adjusted power level threshold $P_{TH}$ and provide results of such measurements to power control processor 28. Power control processor 28, in response thereto, then generates appropriate power control messages.

In step 106, power control processor 28 compares the power level for the current window received in step 102 to the adjusted power level threshold adjusted in step 104. In step 108, power control processor 28 provides to base station 16a the appropriate power control message based on the comparison between the power level of the current window and the adjusted threshold.

Various alternative embodiments of the exemplary embodiment described above are possible. In a first alternative embodiment, fewer power control messages can be sent by mobile station 12 during each frame. For example, rather than employing the relatively fast report rate on the reverse link of 8 or 16 bits per frame (e.g., the 8 power control messages per frame of FIGS. 3A–3D), only one bit per frame could be employed. Such a single bit could indicate a quality of the currently received frame, rather than its power level deviation from an desired power level, such as employing a single frame eraser indicator bit (EIB) message transmitted as the power control message. The EIB message implicitly indicates a power level of the currently received frame because if the EIB indicates that a current frame is erased, it is likely that the forward link signal received by mobile station 12 has insufficient power.

For example, quality measurement circuit 26 can determine whether an entire frame in the received forward link signal contains errors or is erased. In response thereto, power control processor 28 can produce an EIB message for each frame that indicates whether a current received frame contains an erasure. An EIB binary value of "0" can indicate an acceptable received frame, while a value of "1" can indicate an erased frame.

Figure 5:
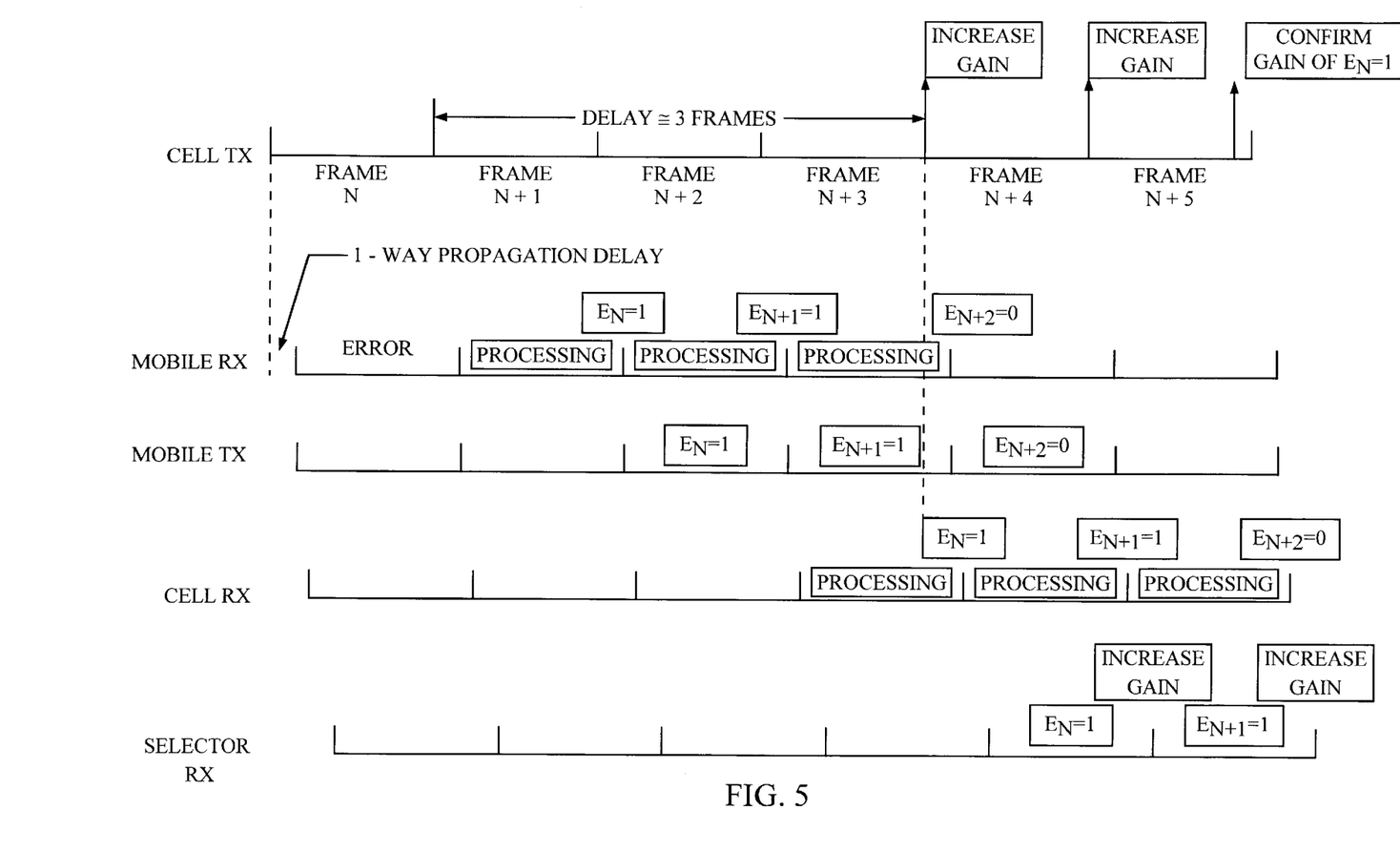
FIG. 5 is a timing diagram showing delays inherent in the closed-loop power control system of FIG. 1 under an alternative embodiment of the present invention.

Referring to the timeline of FIG. 5, typical delays inherent under the first alternative embodiment will be described. If base station 16a transmits a current frame (frame n), mobile station 12 receives that frame a small one-way propagation delay later, as noted above. Because of the time necessary to demodulate and attempt to decode the frames, mobile station 12 does not determine that the frame n is erroneous until one frame later (frame n+1), at which time it generates an EIB message or error bit $E_n$=1. One frame thereafter (frame n+2), mobile station 12 transmits the error bit $E_n$=1. During the next frame (frame n+3), base station 16a processes the error bit $E_n$=1, and increases the power of the forward link signal by 1 dB. Therefore, as shown in FIG. 5, if an error occurs during mobile station's 12 receipt of frame n, it is not until three frames later (frame n+3) that base station 16a increases the forward link signal gain. As a result, the subsequent frame (frame n+4) is transmitted by base station 16a at the increased power level.

Power control processor 28 of mobile station 12 compensates for this three-frame delay under routine 100. For example, if errors occurred during frames n+1 and n+2, the mobile station provides an EIB value of 1 during frame n+1, but provides a value of zero during frame n+2, anticipating that the 1 bits during frames n and n+1 ($E_n$ and $E_{n+1}$=1) will adequately increase the power of the forward link signal.

Such an alternative embodiment of one bit per frame is acceptable for small dropouts in the forward link signal. However, deep fades in the forward link signal of 20 to 30 dB cannot be quickly and acceptably corrected at a rate of 1 dB per frame.

Base station controller 14 under the first alternative embodiment can monitor and confirm the changes in power that base station 16a makes in response to the EIB messages. Thus, during the same frame that base station 16a processes the error bit $E_n$=1 (frame n+3), the base station also transmits the error bit to base station controller 14. Base station controller 14, however, does not process the increase in gain of the forward link signal until one frame thereafter (frame n+4). Still one frame later (frame n+5), base station controller 14 communicates with base station 16a and confirms that the increase in gain was proper or provides a proper adjustment (if necessary). As shown in FIG. 5, a delay of 5 frames occurs between when an error first occurs during frame n and the increase in gain of the forward link signal is confirmed by base station 16a during frame n+5. The adjustment to the transmission power in response to any commands from base station controller 14 will not be applied until frame n+6. The timing diagram of FIG. 5 illustrates the typical two-frame additional delay which would result from allowing base station controller 14 to control the transmission power from base stations 16a and 16b, as described more fully below.

In a second alternative embodiment, the present invention is substantially similarly applied to controlling power of the reverse link. Therefore, power control processor 34 of base station 16a can perform routine 100 and adjust a power level threshold of the reverse link. For example, base station 16a transmits power control messages over the forward link channel to the mobile station, where the messages indicate the quality of each frame or portions of the frame received in the reverse link channel. Base station 16a properly adjusts its reverse link power level thresholds with which it compares incoming frames, or portions thereof, to reflect the power level it anticipates receiving of the reverse link channel, after a delay substantially similar to the aforementioned delay. As a result, base station 16a can adjust its measurement threshold to more closely correspond to future power adjustments. Further details on such a second alternative embodiment are omitted for reasons of brevity, because such embodiment is readily understandable to those skilled in the relevant art based on the detailed description of the first embodiment provided above.

In a third alternative embodiment, base station controller 14 controls the adjustment of the power level for the forward link signal of each base station 16a, 16b, etc. Referring back to FIG. 2, under the third alternative embodiment, backhaul transceiver 39 in base stations 16a and 16b, provides signals, including the power control messages, to selector receiver system 40 in base station controller 14. The power control messages transmitted by mobile station 12 can represent the change or difference from the desired level. Selector control processor 42 receives the power control messages from selector receiver system 40, and under routine 100, determines whether to increase or attenuate the forward link signal transmitted by base stations 16a or 16b. Selector transmitter system 44 receives power control commands from selector control processor 42, and provides them to one or more of backhaul transceivers 39 in base stations 16a and/or 16b. In response thereto, backhaul transceiver 39 provides the power control commands to power control processor 34 to control the power of the forward link signal. Selector control processor 42 must, of course, take into consideration the additional delay caused in transmitting the power control messages from base station 16a to base station controller 14, and a delay caused by forwarding the commands from the base station controller back to the base station as shown in FIG. 5. Since base station controller 14 is coupled to and can receive power control messages from base stations 16a, 16b, etc., it can provide more accurate commands to the base stations, especially during soft handoff conditions.

In a fourth alternative embodiment, power control processor 28 can provide more than a single bit per window or frame in each power control message. For example, if two bits per power control message are sent, the power control message can indicate either a +1 dB increase, a +2 dB increase, a −1 dB decrease or a command to maintain the current power level of the forward link signal. While such longer power control messages under the fourth alternative embodiment will require increased bandwidth along the reverse link signal, such power control messages could more rapidly adjust and maintain the forward link signal at the desired level.

In a fifth alternative embodiment, power control processor 28 of mobile station 12 can "fine tune" its power control messages over a multiframe period. For example, power control processor 28 can monitor its performance and determine whether the power control messages it feeds back to base station 16a regularly and incorrectly request a +1 dB increase during a 10 window period. Therefore, power control processor 28 can automatically request a −1 dB decrease every 10 windows to compensate for this error. Alternatively, the power control threshold can be adjusted by a fractional amount. For example, if power control processor 28 recognizes that 20% of its power control messages request an incorrect increase in the forward link signal, then the threshold can be adjusted downward by 20%.

In a generalized embodiment, mobile station 12 determines a quality of the received forward link signal. For example, the mobile station, may measure the symbol error rate of the received forward link signal. The mobile station would compare this received symbol error rate for the frame or portion of the frame to an adjustable threshold value. The quality threshold is adjusted based on prior, unexecuted control commands which mobile station 12 has previously transmitted to base station 16a. The mobile station can adjust the frame error rate by means of a look up table which would predict the effect on future symbol error rate measurement that previously unexecuted commands would have. Similary, the mobile station could measure the signal to noise ratio of the forward link signal. In a simplified embodiment, the mobile station would adjust the signal to noise ratio threshold under the assumption that the noise level remains constant. Thus, the generalized invention would measure a quality indication in the received signal and compare that quality measurement to an adjustable threshold which is adjusted in accordance with an estimate of how that quality measurement will be effected by power control commands not yet executed by the remote station.

Although specific embodiments of, and examples for, the present invention are described herein for illustrative purposes, various equivalent modifications can be made without departing from the spirit and scope of the invention, as will be recognized by those skilled in the relevant art. For example, the various embodiments described herein can be combined to provide further embodiments. In general, the power control routine described in detail above is exemplary, and those skilled in the relevant art can create similar routines under the teachings and concepts of the present invention.

The teachings provided herein of the present invention can be applied to other communication systems, not necessarily the exemplary CDMA communication system described above. For example, while the present invention has been generally described above as being employed in the CDMA communication system 10, the present invention is equally applicable to other digital or analog cellular communication systems. The present invention can also be modified, if necessary, to employ the systems, circuits and concepts of the various patents described above, all of which are incorporated herein by reference as if set forth in their entirety.

These and other changes can be made to the invention in light of the above detailed description. In general, in the following claims, the terms used should not be construed to limit the invention to the specific embodiments disclosed in the specification and the claims, but should be construed to include any communication system that operates in accordance with the claims to provide transmission power control. Accordingly, the invention is not limited by the disclosure, but instead its scope is to be determined entirely by the following claims.

We claim:

1. A method for controlling the transmission power of communication signals transmitted by a base station, the method comprising the steps of:
   a) at said base station, receiving a power control command from said user station;
   b) providing said power control command to a base station controller;
   c) providing from said base station controller to said base station a power adjustment command in accordance with said power control command, wherein said steps of providing said power control command to said base station controller and providing said power adjustment command to said base station in response thereto results in a response delay;
   d) transmitting from said base station a current communication signal at a transmit power level based on said power adjustment command;
   e) at said user station, receiving said current communication signal;
   f) at said user station, determining a received power level of said current communication signal;
   g) at said user station, adjusting a power level threshold based on a predetermined number of power control messages previously transmitted by said user station to said base station wherein said predetermined number is determined in accordance with said response delay;
   h) at said user station, comparing the adjusted power level threshold to said received power level of said current communication signal;
   i) at said user station, transmitting a current power control message based on said step of comparing; and
   j) at said base station, transmitting a new communication signal at an adjusted power level in accordance with said current power control message.

2. The method of claim 1 wherein said response delay is approximately two frames.

3. The method of claim 1 further comprising the step of generating a random value when said adjusted power level threshold is equal to said received power level of said current communication signal, and generating said current power control message from said random value.

4. A method for controlling transmission signal power of signals transmitted by a base station, the method comprising the steps of:
   a) at said base station, transmitting a current communication signal;
   b) at a user station, receiving said current communication signal from said base station;
   c) at said user station, decoding said current communication signal;
   d) at said user station, performing a quality measurement of said current communication signal;
   e) at said user station, determining the value of a current error indicator bit in accordance with said quality measurement of said decoded signal and at least one previously transmitted error indicator bit;
   f) at said user station, transmitting said current error indicator bit; and
   g) at said base station, transmitting a new communication signal at an adjusted power level based on said current error indicator bit.

5. The method of claim 4 wherein said step of performing a quality measurement further comprises measuring signal to noise ratio of said current communication signal.

6. The method of claim 4 wherein said step of performing a quality measurement further comprises measuring the symbol error rate of said current communication signal.

7. The method of claim 4 wherein said step of performing a quality measurement further comprises measuring the Yamamoto metric of said current communication signal.

8. The method of claim 4 wherein said step of performing a quality measurement further comprises evaluating the parity bit check indication of said current communication signal.

9. A method for controlling transmission signal power of communication signals transmitted by a base station, the method comprising the steps of:
   a) at said base station, transmitting a current communication signal;
   b) at a user station, receiving said current communication signal from said base station;
   c) at said user station, determining a power level of said current communication signal;
   d) at said user station, comparing a power level threshold to said power level of said current communication signal;
   e) at said user station, generating a power control message based on said step of comparing;
   f) at said user station, reversing the value of said power control message when a predetermined number of messages of like value have been generated, to produce a reversed power control message;
   g) at said user station, transmitting said reversed power control message; and
   h) at said base station, transmitting a new communication signal at an adjusted power level based on said reversed power control message.

10. A method for controlling transmission signal power of communication signals transmitted by a base station, the method comprising the steps of:
    a) at said base station, transmitting a current communication signal;
    b) at a user station, receiving said current communication signal from said base station;
    c) at said user station, computing a symbol error rate of said current communication signal;
    d) at said user station, adjusting a symbol error rate threshold based on at least one prior power control message previously transmitted by said user station to said base station;
    e) at said user station, comparing the adjusted symbol error rate threshold to said symbol error rate of said current communication signal;
    f) at said user station, transmitting a current power control message based on said step of comparing; and
    g) at said base station, transmitting a new communication signal at an adjusted power level based on said current power control message.

* * * * *